(12) United States Patent
Jiang et al.

(10) Patent No.: US 12,157,495 B2
(45) Date of Patent: Dec. 3, 2024

(54) WEIGHTED PLANNING TRAJECTORY PROFILING METHOD FOR AUTONOMOUS VEHICLE

(71) Applicant: Baidu USA LLC, Sunnyvale, CA (US)

(72) Inventors: Shu Jiang, Sunnyvale, CA (US); Qi Luo, Sunnyvale, CA (US); Yu Cao, Sunnyvale, CA (US); Weiman Lin, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 196 days.

(21) Appl. No.: 17/396,405

(22) Filed: Aug. 6, 2021

(65) Prior Publication Data

US 2023/0042001 A1 Feb. 9, 2023

(51) Int. Cl.
*B60W 60/00* (2020.01)
*B60W 40/04* (2006.01)
*B60W 40/072* (2012.01)

(52) U.S. Cl.
CPC ........ *B60W 60/0011* (2020.02); *B60W 40/04* (2013.01); *B60W 40/072* (2013.01); *B60W 60/0013* (2020.02); *B60W 2556/40* (2020.02); *B60W 2556/45* (2020.02)

(58) Field of Classification Search
CPC ......... B60W 60/0011; B60W 60/0013; B60W 40/04; B60W 40/072; B60W 2256/40; B60W 2556/45
See application file for complete search history.

(56) References Cited

U.S. PATENT DOCUMENTS

| | | | | |
|---|---|---|---|---|
| 10,407,078 B2 * | 9/2019 | Ratnasingam | ......... | B60K 35/00 |
| 10,807,599 B2 * | 10/2020 | Zhu | ................... | G08G 1/096775 |
| 10,824,153 B2 * | 11/2020 | Zhang | .................... | G08G 1/167 |
| 11,465,617 B2 * | 10/2022 | Xu | ................... | G08G 1/096811 |

(Continued)

FOREIGN PATENT DOCUMENTS

| | | | | |
|---|---|---|---|---|
| CN | 109435955 B | * | 8/2020 | ............ B60W 40/00 |
| JP | 4645203 B2 | * | 3/2011 | ......... G01C 21/3415 |
| WO | WO-2018217526 A1 | * | 11/2018 | ........ B60W 50/0098 |

OTHER PUBLICATIONS

"Huang, WuLing; Task-Specific Performance Evaluation of UGVs: Case Studies at the IVFC; Oct. 5, 2014; IEEE Transactions on Intelligent Transportation Systems; vol. 15 No 5" (Year: 2014).*

*Primary Examiner* — Elaine Gort
*Assistant Examiner* — Christopher R Cardimino
(74) *Attorney, Agent, or Firm* — WOMBLE BOND DICKINSON (US) LLP

(57) ABSTRACT

In one embodiment, an exemplary method includes the operations of receiving, at a profiling application, a record file recorded by the ADV for a driving scenario in an area, and a high definition map matching the area; extracting planning messages and perception messages from the record file; and aligning the planning message and the perception messages based on their timestamps. The method further includes calculating an individual performance score for each planning cycle of the ADV for the driving scenario based on the planning messages; calculating a weight for each planning cycle based on the perception messages and the high definition map; and then calculating a weighted score for the driving scenario based on individual performance scores and their corresponding weights.

20 Claims, 7 Drawing Sheets

(56) References Cited

U.S. PATENT DOCUMENTS 11,556,128 B2 * 1/2023 Li .................. G06F 11/3672
2020/0310421 A1 * 10/2020 Kwon ............... B60W 50/00
2021/0403035 A1 * 12/2021 Danna ............ B60W 60/0011

* cited by examiner

WEIGHTED PLANNING TRAJECTORY PROFILING METHOD FOR AUTONOMOUS VEHICLE

Embodiments of the present disclosure relate generally to operating autonomous vehicles. More particularly, embodiments of the disclosure relate to evaluating the motion planning performance of an autonomous vehicle.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

An autonomous driving vehicle relies on various modules in automatically driving itself. One of the important modules is a planning module, which can generate trajectories for the vehicle to follow. An accurate evaluation of the performance of the planning module can be beneficial to the calibration and tuning of the vehicle.

However, when evaluating the motion planning performance of an autonomous vehicle in a scenario such as going through a traffic intersection, existing solutions typically only examine a single planning trajectory based on fields like acceleration etc. If a single score for a scenario is needed, a simple average score across all the frames is used to indicate how well the planning module is performing for the entire scenario. These existing solutions do not take into consideration the varying traffic conditions at different stages of a driving scenario, and therefore could not accurately evaluate the performance of the motion planning of a vehicle.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
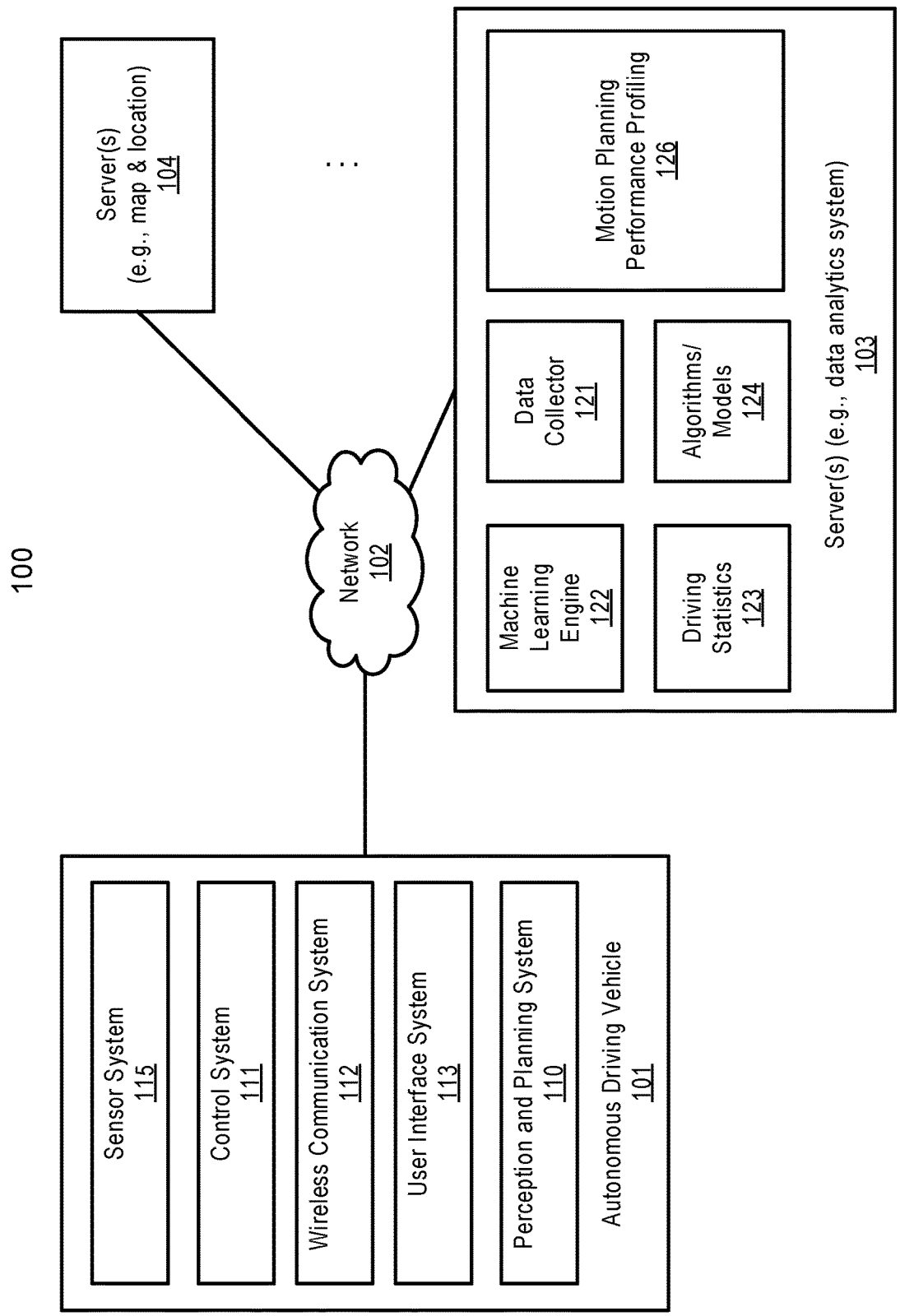
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiment, systems, disclosed herein are methods, systems, and media for evaluating motion planning performance of an automatic vehicle that drives through a driving scenario. The embodiments weigh each stage of the driving scenario differently based on the complexity of the driving environment of that stage, thus providing a more accurate evaluation of the motion planning performance of the autonomous vehicle.

In one embodiment, an exemplary method includes the operations of receiving, at a profiling application, a record file recorded by the ADV for a driving scenario in an area, and a high definition map matching the area; extracting planning messages and perception messages from the record file; and aligning the planning message and the perception messages based on their timestamps. The method further includes calculating an individual performance score for each planning cycle of the ADV for the driving scenario based on the planning messages; calculating a weight for each planning cycle based on the perception messages and the high definition map; and then calculating a weighted score for the driving scenario based on individual performance scores and their corresponding weights.

In one embodiment, a planning cycle, also referred to as a frame, is a time interval (e.g., 100 ms) during which a planned trajectory is generated for a following time period (e.g., next 2 seconds). The profiling application has one or more standard interfaces that enable users to upload the record file and the high definition map, and is configured to run either on the ADV or on a cloud server.

In one embodiment, the weight of each planning cycle can be calculated based one or more of factors that include a curvature of a planned path, a number of obstacles that have overlapped trajectories with the ADV, or a junction size. Each factors can be derived either from the perception messages or from the high definition map.

In one embodiment, calculating the weighted score for the driving scenario further comprises the operations of calculating a weighted score for each planning cycle by multiplying the individual performance score of the planning cycle and the corresponding weight for the planning cycle; summing up the weighted score for each planning cycle to generate a total weighted score; and dividing the total weighted score by a number of the planning cycles.

In one embodiment, the driving scenario includes a plurality of stages, each stage corresponding to one or more planning cycles and having a different driving environment. The individual performance score for each planning cycle is calculated based on factors measuring controllability and comfort.

The embodiments described above are not exhaustive of all aspects of the present invention. It is contemplated that the invention includes all embodiments that can be practiced from all suitable combinations of the various embodiments summarized above, and also those disclosed below.

Autonomous Driving Vehicle

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An ADV refers to a vehicle that can be configured to in an autonomous mode in which the vehicle navigates through an environment with little or no input from a driver. Such an ADV can include a sensor system having one or more sensors that are configured to detect information about the environment in which the vehicle operates. The vehicle and its associated controller(s) use the detected information to navigate through the environment. ADV 101 can operate in a manual mode, a full autonomous mode, or a partial autonomous mode.

In one embodiment, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as, an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
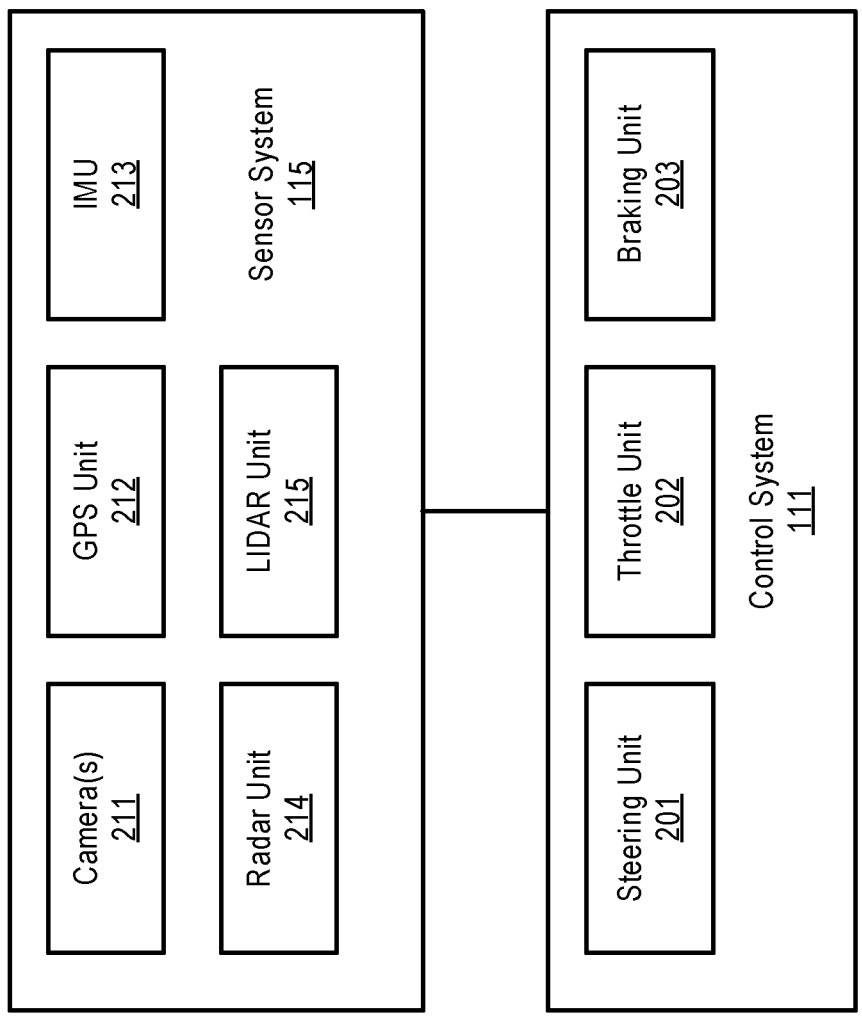
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In some embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between ADV 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip related data. For example, ADS 110 may obtain location and route data from an MPOI server, which may be a part of servers 103-104. The location server provides location services and the MPOI server provides map services and the POIs of certain locations. Alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third party entity. Alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. Algorithms 124 can then be uploaded on ADVs to be utilized during autonomous driving in real-time.

Server 103 can also include a motion planning performance profiling application 126, which can be a cloud service to evaluate the performance of the motion planning performance of an ADV, for example, the performance of a planning module as described below.

Figure 3A:
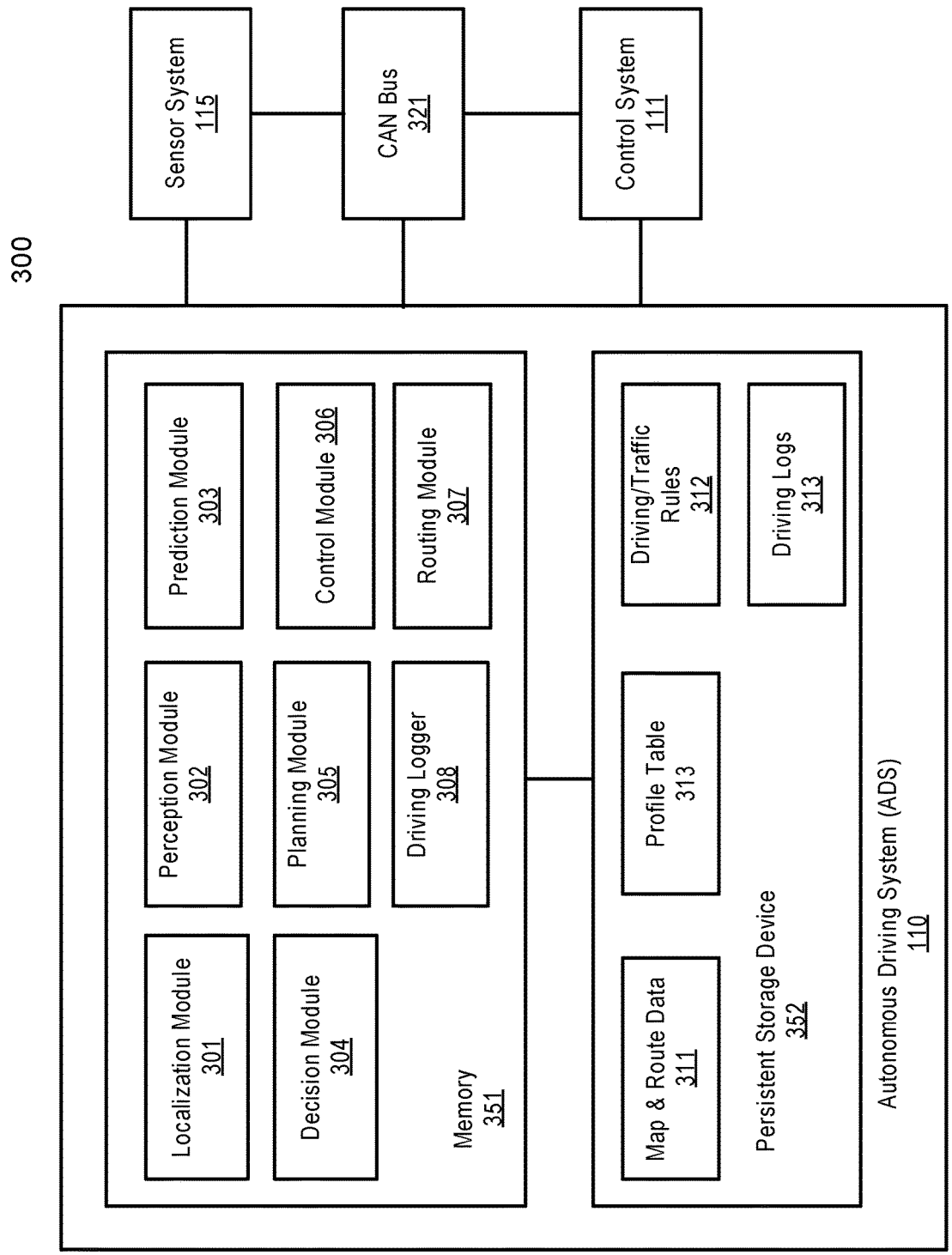
FIGS. 3A-3B are block diagrams illustrating an example of a perception and planning system used with an autonomous vehicle according to one embodiment.
Figure 3B:
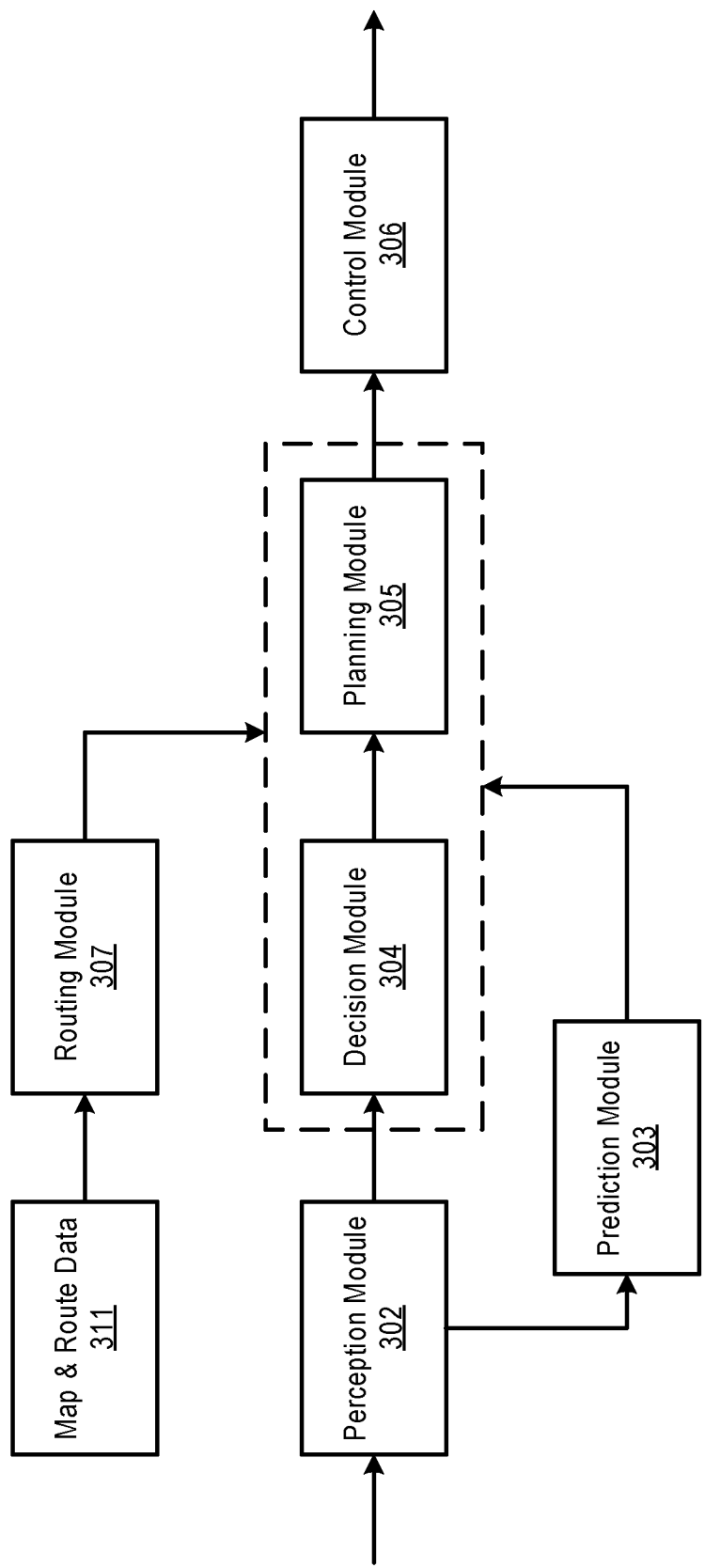

FIGS. 3A and 3B are block diagrams illustrating an example of an autonomous driving system used with an ADV according to one embodiment. System 300 may be implemented as a part of ADV 101 of FIG. 1 including, but is not limited to, ADS 110, control system 111, and sensor system 115. Referring to FIGS. 3A-3B, ADS 110 includes, but is not limited to, localization module 301, perception module 302, prediction module 303, decision module 304, planning module 305, control module 306, routing module 307, and driving logger 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

Perception module 302 may include an emergency vehicle detection module 308, which can detect the presence of an emergency vehicle in a surrounding environment of the ADV using both audio data and visual data.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point.

For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route or trajectory for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111 via a CAN bus module 321, according to a trajectory (also referred to as a route or path) defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system can incorporate data from a GPS system and one or more maps so as to determine the driving path for the ADV 101.

Driving logger 309 records driving records from at least three data channels of the ADV control system: a control channel, a chassis channel, and a localization channel. The control channel produces information about control commands to control systems of the ADV, such as braking, throttle, and steering. The chassis channel produces information from various sensors, such as accelerometers, and readings of actual positions or actuations of the braking, throttle, and steering systems. The localization channel produces information regarding the actual location and heading of the ADV with reference to a standard reference such as a high-definition (HD) map or a global positioning satellite (GPS) system. Driving records can be recorded at approximately 100 frames per second (fps), or at about 10 milliseconds (ms) per frame. Each driving record has a timestamp. A timestamp can be an absolute timestamp in the form of hh:mm:ss:ms (hours, minutes, seconds, milliseconds) relative to a start time, such as the start of a driving route. In embodiment, the timestamp can be a frame number, relative to a start time such as the start of the driving route. In an embodiment, each driving record can additional have a date stamp in addition to the time stamp. Driving logger 309 can log driving records for simulated ADV driving sessions as well as real-world ADV driving sessions.

Driving logger 309 can write the driving records to a non-volatile storage such as driving logs storage 313. Driving logs 313 can be uploaded automatically or manually to a server system, e.g. server(s) 103-104, to generate a set of standardized performance metrics that grade the performance of one of more autonomous driving modules of the ADV.

Motion Planning Performance Profiling

Figure 4:
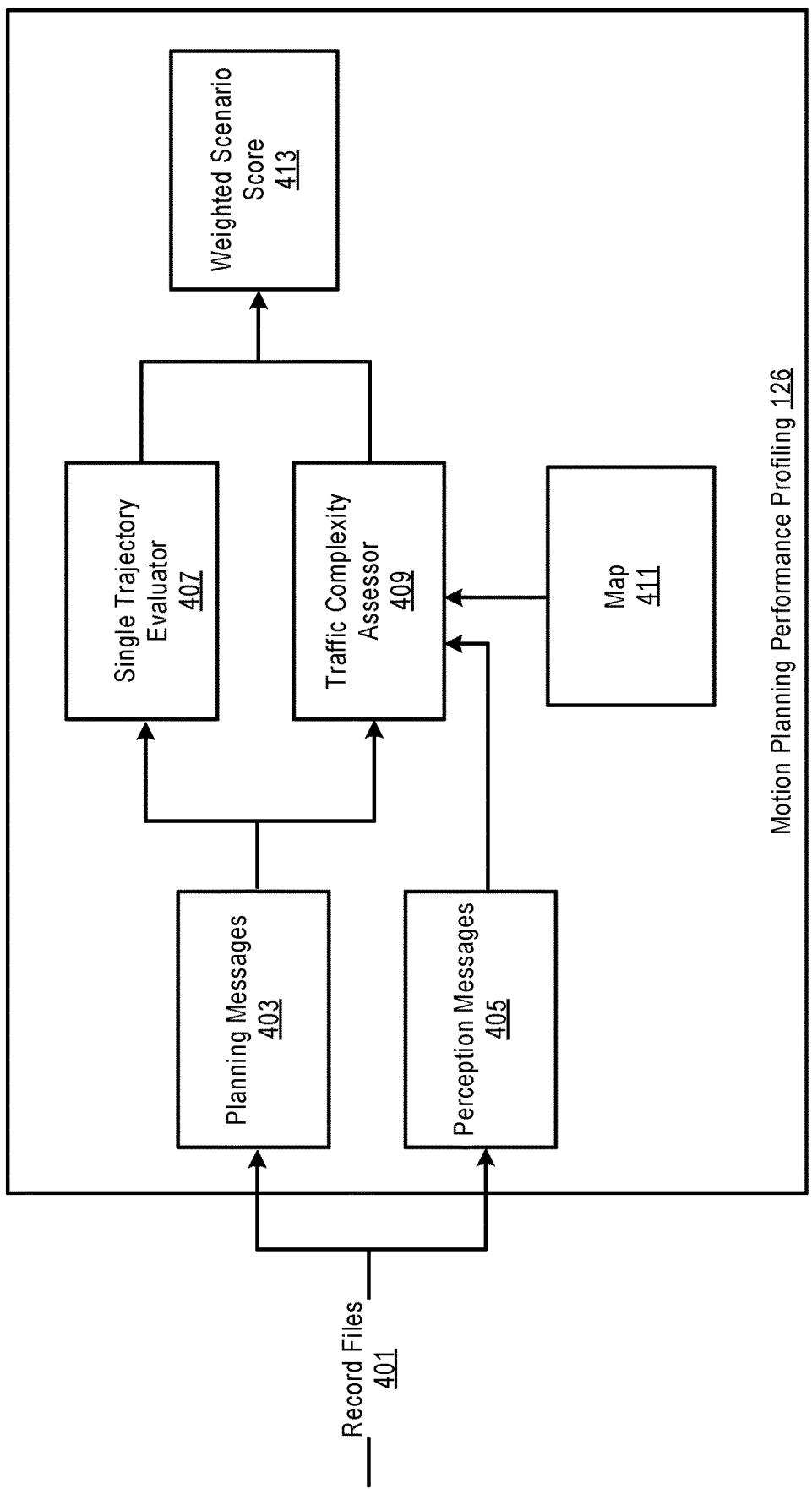
FIG. 4 illustrates a system for evaluating the performance of a planning module of the ADV in accordance with an embodiment.

FIG. 4 illustrates a system for evaluating the performance of a planning module of the ADV in accordance with an embodiment.

The motion planning performance profiling application 126 can run on a server, such as server 103 as described in FIG. 1; and can directly receive record files recorded by a driving logger (e.g., the driving logger 308) from an autonomous driving vehicle either during road tests or during simulations. The motion planning performance profiling application 126 can also include a number of standard interfaces, allowing users to upload record files 401 to server 103, and to specify a high definition map 411 matching the area where the ADV is travelling, ether during a simulation or a road test. In one embodiment, the record file is in a particular format, e.g., Baidu's Apollo file format.

As further shown, the motion planning performance profiling application 126 can extract planning messages 403 and perception messages 405 from the record files 401. The planning messages 403 and the perception messages 405 can be aligned according to their timestamps.

As used herein, a message is a real-time output of a corresponding module while the module is in operation in driving an autonomous driving vehicle. For example, a planning message can be generated by a planning module for each frame (e.g., at each 100 ms), and can provide a planned path for a following time interval (e.g., for the next 2 seconds). A planning message can provide information for reference points that are evenly distanced from each other on a planned path/trajectory generated by the ADV for each frame. For example, a planning message can specify at which direction the ADV is expected to take at each reference point, at what speed, and at what curvature. A perception message can be generated by a perception module, and can include information collected by cameras and/LiDAR device, such as lane configuration, traffic light signals, a relative position of another vehicle, a pedestrian, a building, crosswalk, or other traffic related signs (e.g., stop signs, yield signs), etc.

A single trajectory evaluator 407 can receive the planning messages 403, evaluate the planning messages 403 based on factors such as controllability and comfort, and generate an individual score indicating the performance of the planning module in each planning cycle, i.e. a frame. In this disclosure, controllability can be measured by factors such as non-gear-switch trajectory length ratio, an initial heading difference ratio, a normalized curvature ration, a curvature changing rate ratio, an acceleration ratio, a deceleration ratio, and a longitudinal jerk ratio. Comfort can be measured by factors such as a longitudinal jerk ratio, lateral jerk ratio, a longitudinal acceleration ratio, and a lateral acceleration ratio, a longitudinal deceleration ratio, a lateral deceleration ration, a distance to boundaries ratio, a distance to obstacle ratio, and a time to collision ratio.

For a particular driving scenario with a certain duration (e.g., from 20 s to 5 minutes), the ADV may experience multiple frames. In one example, the duration of one frame is 100 ms. During each frame, the planning module may generate a planned trajectory for the ADV in a following time interval (e.g., the next 2 seconds). For each frame, the single trajectory evaluator 407 can calculate an individual performance score based on the factors in controllability and comfort.

Simultaneously with the calculating of the individual performance score for a frame, a traffic complex assessor 409 can calculate a weight for that frame based on information from the high definition map 411 and the perception messages 405. The information from the high definition map can include traffic signs, and lane marks. The perception messages 405 can provide traffic conditions such as surrounding vehicles, and pedestrians. A method of calculating the weight for each frame is described in FIG. 5 below.

After obtaining the individual performance score based on the planning messages 403 for each frame for a driving scenario (e.g. as passing through a red light at an intersection) and a weight for that frame, the motion planning performance profiling application 126 can calculate a final weighted score 413 for the entire driving scenario based on the formula SUM(score*weight)/Total number of trajectories. Note that the total number of trajectories is equivalent to the total number of frames because the ADV generates one trajectory for each frame.

Figure 5:
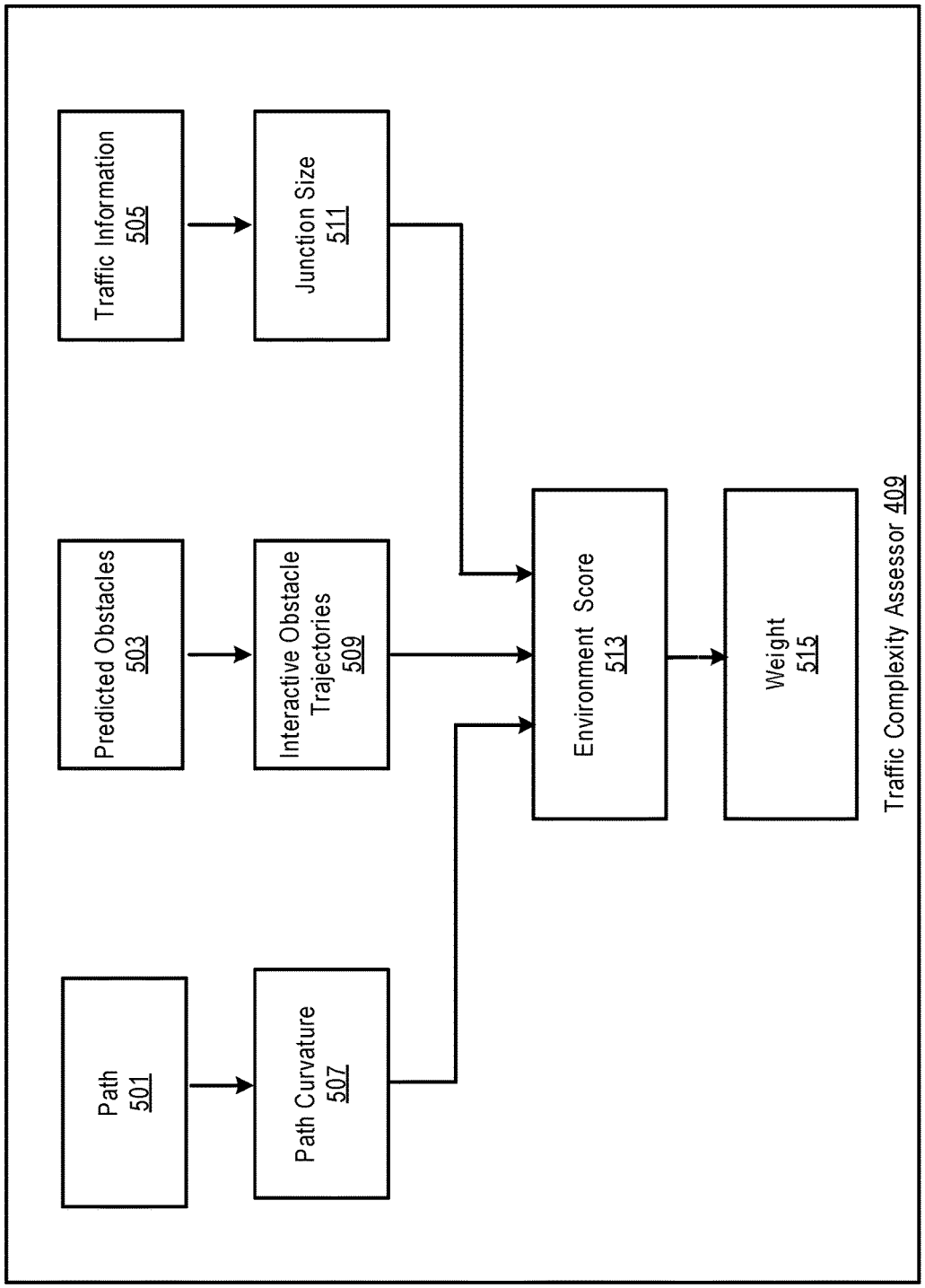
FIG. 5 illustrates factors used to calculate a weight for a frame in accordance with an embodiment.

FIG. 5 illustrates factors used to calculate a weight for a frame in accordance with an embodiment.

As described above, embodiments of the disclosure consider weights of different frames when calculating a scenario score to measure the performance of the planning module of the ADV. The weights of the frames reflect the complexity of the road conditions and traffic conditions at the moment that planned trajectories are generated. In a driving scenario, such as when an autonomous vehicle is near a traffic intersection, the vehicle could experience different stages from cruising along a lane, coming into a full stop upon detecting red lights, starting to accelerate once the traffic lights change to green, and traveling through the intersection safely. Each stage may be different in terms of the complexity of the traffics and road conditions, and thus present different challenges to the planning module. As such, the planning trajectories in the different stages should not be valued equally in calculating a final score to measure the performance of the planning module.

For example, it would be easier to cruise along the lane following the traffic flow, and thus a lower weight could be assigned to planning trajectories in this stage. On the other hand, planning trajectories involved in going through the intersection would be more complicated, and should have a higher weight. The weighted profiling method can better indicate the performance of a planning module is doing, compared to a uniform weighting method.

In an embodiment, each stage may correspond to one or more frames of the autonomous vehicle because it may take the vehicle more than one planning cycle (i.e. one frame) to go through one stage. When one stage corresponds to more than one frame, each frame corresponding to that stage can have a higher weight.

FIG. 5 shows factors used to calculate a weight for one frame. Values of the factors 501-511 used to calculate an environment score, from which a weight 515 can be derived, are values of the factors during that frame.

As shown in FIG. 5, such factors can include a path curvature 507, a number of interactive obstacles 509 that have overlapped trajectories with the ego vehicle, and/or a junction size 511. The path curvature 507 can be derived from a planned path 501 generated by the planning module for the frame, the interactive obstacles 509 can be derived from predicted obstacles 503 during the frame based on the perception messages, and the junction size 511 can be derived from a corresponding portion of the high definition map, after determining that that the ego vehicle is a junction or a roundabout based on traffic information 505 shown by the perception messages 405.

In one embodiment, a predetermined algorithm may be used to calculate an environment score 513 based on values of the above factors from the frame. From the environment score 513, a weight 515 for the frame can be derived. The weight 515 can be a fraction or decimal number, and can be linearly proportional to the environment score.

Figure 6:
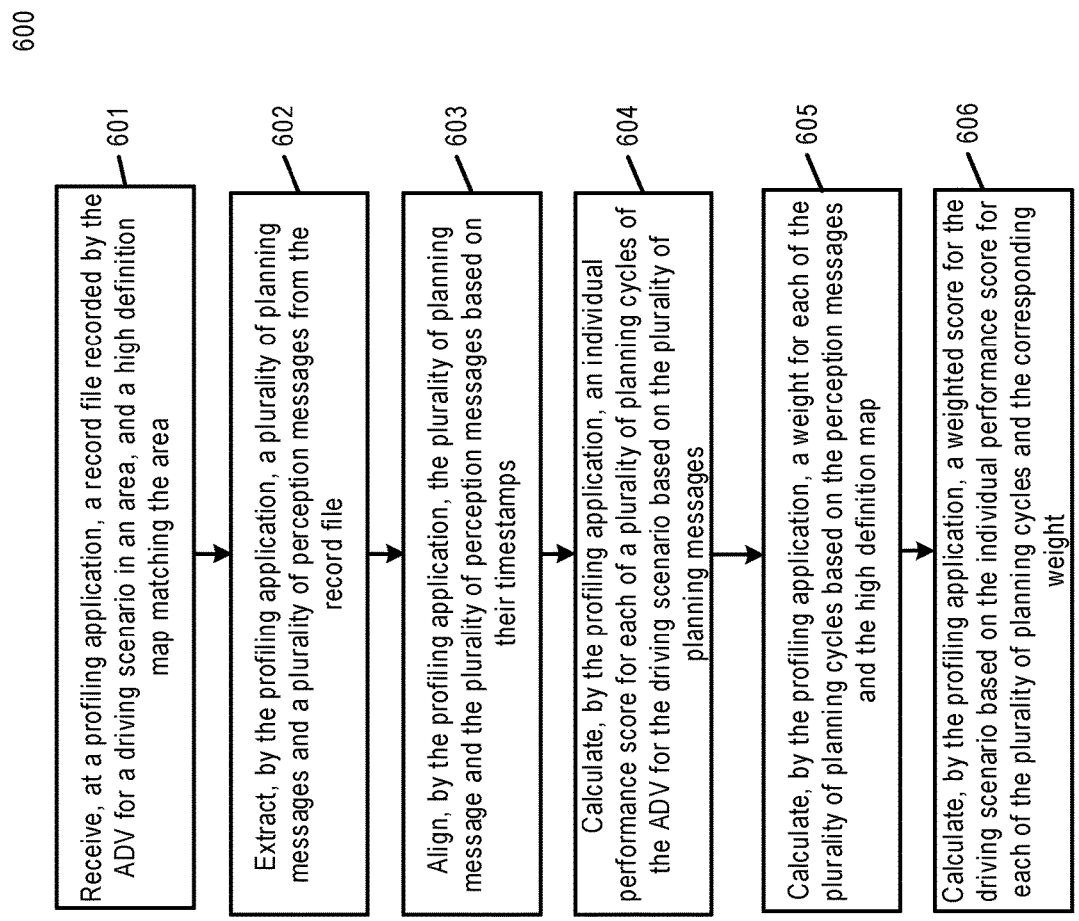
FIG. 6 is a flow chart illustrating a process 600 of evaluating the performance of a planning module of the ADV in accordance with an embodiment.

FIG. 6 is a flow chart illustrating a process 600 of evaluating the performance of a planning module of the ADV in accordance with an embodiment. Process 600 may be performed by processing logic which may include software, hardware, or a combination thereof. For example, process 600 may be performed by the motion planning performance profiling application 126 described in FIG. 1 and FIG. 4.

As shown in FIG. 6, in operation 601, the processing logic receives a record file recorded by the ADV for a driving scenario in an area, and a high definition map matching the area. The driving scenario can last a certain period of time, and can include multiple stages, each stage with a different driving environment, e.g., different traffic conditions and/or road conditions. For example, when an autonomous vehicle is near a traffic intersection, it could involve the stages from cruising along the lane, coming into a full stop upon detecting the red light, starting to accelerate once the traffic light changes to green, traveling through the intersection safely. For each of the stages, the complexity of the traffic situation is different, and thus the difficulty of motion planning. In operation 602, the processing logic extracts planning messages and perception messages from the record file. The record file is recorded by the ADV during a simulation or a road test. In operation 603, the processing logic aligns the planning messages and the perception messages based on their timestamps. In this operation, each planning message and each perception message are matched such that both messages cover the same planning cycle. In operation 604, the processing logic calculates an individual performance score for each planning cycle of the ADV when the ADV is driving through the driving scenario. The individual performance score is based on factors extracted from the planning messages. In operation 605, the processing logic calculates a weight for each planning cycle based on the perception messages and the high definition map. In operation 606, the processing logic calculates a weighted score for the driving scenario based on the individual performance score for each planning cycle and the corresponding weight.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of evaluating a planning performance of an autonomous driving vehicle (ADV), the method comprising:
   generating, for each of a plurality of planning cycles, one or more control commands including a throttle command, a brake command, and a steering command;
   driving the ADV in an area using the one or more control commands;
   storing driving records of the ADV associated with the driving of the ADV in a driving scenario in the area;
   providing, by a profiling application executed by a processor, an interface to a user;
   receiving, through the interface, i) a record file that includes the driving records of the ADV associated with the driving scenario in the area, and ii) a map associated with the area;
   extracting, by the profiling application executed by a processor, a plurality of planning messages and a plurality of perception messages from the record file;
   aligning each of the plurality of planning messages and each of the plurality of perception messages in time to each of the plurality of planning cycles;
   calculating, by the profiling application, an individual performance score for each of a plurality of planning cycles of the ADV for the driving scenario based on the plurality of planning messages wherein each of the plurality of planning cycles represent a time interval during which a planned trajectory is generated for a following time period;

calculating, by the profiling application, a weight for each of the plurality of planning cycles based on the perception messages and the map associated with the area wherein each weight for each of the plurality of planning cycles varies based on one or more factors associated with an environment of the ADV;

calculating, by the profiling application, a weighted score for the driving scenario based on the individual performance score for each of the plurality of planning cycles and the corresponding weight, wherein calculating the weighted score comprises multiplying the individual performance score of each of the plurality of planning cycles and the corresponding weight for that planning cycle, and summing up the weighted score for each of the plurality of planning cycles to generate a total weighted score.

2. The method of claim 1, wherein the profiling application is configured to run either on the ADV or on a cloud server.

3. The method of claim 1, wherein the one or more factors include a curvature of a planned path, a number of obstacles that have overlapped trajectories with the ADV, or a junction size, wherein each of the one or more factors is derived either from the plurality of perception messages or from the map.

4. The method of claim 1, wherein calculating the weighted score for the driving scenario further comprises:
dividing the total weighted score by a number of the plurality of planning cycles.

5. The method of claim 1, wherein the driving scenario includes a plurality of different stages, each stage corresponding to one or more planning cycles and having a different driving environment.

6. The method of claim 1, wherein the individual performance score for each of the plurality of planning cycles is based on factors measuring controllability and comfort.

7. The method of claim 1, further comprising providing one or more interfaces that enable a client to upload the record file and the map to a server for determining the planning performance of the ADV.

8. A non-transitory machine-readable medium having instructions stored therein, which when executed by a processor, cause the processor to perform operations of evaluating a planning performance of an autonomous driving vehicle (ADV), the operations comprising:
generating, for each of a plurality of planning cycles, one or more control commands including a throttle command, a brake command, and a steering command;
driving the ADV in an area using the one or more control commands;
storing driving records of the ADV associated with the driving of the ADV in a driving scenario in the area;
providing, by a profiling application executed by a processor, an interface to a user;
receiving, through the interface, i) a record file that includes the driving records of the ADV associated with the driving scenario in the area, and ii) a map associated with the area;
extracting the plurality of planning messages and a plurality of perception messages from the record file;
aligning each of the plurality of planning messages and each of the plurality of perception messages in time to each of the plurality of planning cycles;
calculating an individual performance score for each of a plurality of planning cycles of the ADV for the driving scenario based on the plurality of planning messages wherein each of the plurality of planning cycles represent a time interval during which a planned trajectory is generated for a following time period;
calculating a weight for each of the plurality of planning cycles based on the perception messages and a map associated with the area wherein each weight for each of the plurality of planning cycles varies based on one or more factors associated with an environment of the ADV;
calculating a weighted score for the driving scenario based on the individual performance score for each of the plurality of planning cycles and the corresponding weight, wherein calculating the weighted score comprises multiplying the individual performance score of each of the plurality of planning cycles and the corresponding weight for that planning cycle, and summing up the weighted score for each of the plurality of planning cycles to generate a total weighted score.

9. The non-transitory machine-readable medium of claim 8, wherein the operations are performed either on the ADV or on a cloud server.

10. The non-transitory machine-readable medium of claim 8, wherein the one or more factors include a curvature of a planned path, a number of obstacles that have overlapped trajectories with the ADV, or a junction size, wherein each of the one or more factors is derived either from the plurality of perception messages or from the map.

11. The non-transitory machine-readable medium of claim 8, wherein calculating the weighted score for the driving scenario further comprises:
dividing the total weighted score by a number of the plurality of planning cycles.

12. The non-transitory machine-readable medium of claim 8, wherein the driving scenario includes a plurality of different stages, each stage corresponding to one or more planning cycles and having a different driving environment.

13. The non-transitory machine-readable medium of claim 8, wherein the individual performance score for each of the plurality of planning cycles is based on factors measuring controllability and comfort.

14. The non-transitory machine-readable medium of claim 8, wherein the operations further comprise providing one or more interfaces that enable a client to upload the record file and the map to a server for determining the planning performance of the ADV.

15. A data processing system, comprising:
a processor; and
a memory coupled to the processor to store instructions, which when executed by the processor, cause the processor to perform operations of evaluating a planning performance of an autonomous driving vehicle (ADV), the operations comprising:
generating, for each of a plurality of planning cycles, one or more control commands including a throttle command, a brake command, and a steering command;
driving the ADV in an area using the one or more control commands;
storing driving records of the ADV associated with the driving of the ADV in a driving scenario in the area;
providing, by a profiling application executed by a processor, an interface to a user;
receiving, through the interface, i) a record file that includes the driving records of the ADV associated with the driving scenario in the area, and ii) a map associated with the area;
extracting the plurality of planning messages and a plurality of perception messages from the record file, aligning each of the plurality of planning messages and each of the plurality of perception messages in time to each of the plurality of planning cycles;

calculating an individual performance score for each of a plurality of planning cycles of the ADV for the driving scenario based on the plurality of planning messages wherein each of the plurality of planning cycles represent a time interval during which a planned trajectory is generated for a following time period, calculating a weight for each of the plurality of planning cycles based on the perception messages and a map associated with the area wherein each weight for each of the plurality of planning cycles varies based on one or more factors associated with an environment of the ADV, calculating a weighted score for the driving scenario based on the individual performance score for each of the plurality of planning cycles and the corresponding weight, wherein calculating the weighted score comprises multiplying the individual performance score of each of the plurality of planning cycles and the corresponding weight for the planning cycle, and summing up the weighted score for each of the plurality of planning cycles to generate a total weighted score.

16. The data processing system of claim 15, wherein the one or more factors include a curvature of a planned path, a number of obstacles that have overlapped trajectories with the ADV, or a junction size, wherein each of the one or more factors is derived either from the plurality of perception messages or from the map.

17. The data processing system of claim 15, wherein calculating the weighted score for the driving scenario further comprises:
dividing the total weighted score by a number of the plurality of planning cycles.

18. The data processing system of claim 15, wherein the driving scenario includes a plurality of different stages, each stage corresponding to one or more planning cycles and having a different driving environment.

19. The data processing system of claim 15, wherein the individual performance score for each of the plurality of planning cycles is based on factors measuring controllability and comfort.

20. The data processing system of claim 15, wherein the operations further comprise providing one or more interfaces that enable a client to upload the record file and the map to a server for determining the planning performance of the ADV.

* * * * *